Figure 12:
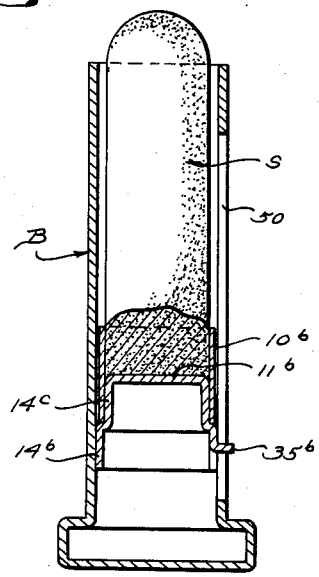

Oct. 12, 1954
H. E. DAVIS
2,691,439
MATERIAL HOLDER
Filed Aug. 2, 1951
2 Sheets-Sheet 1
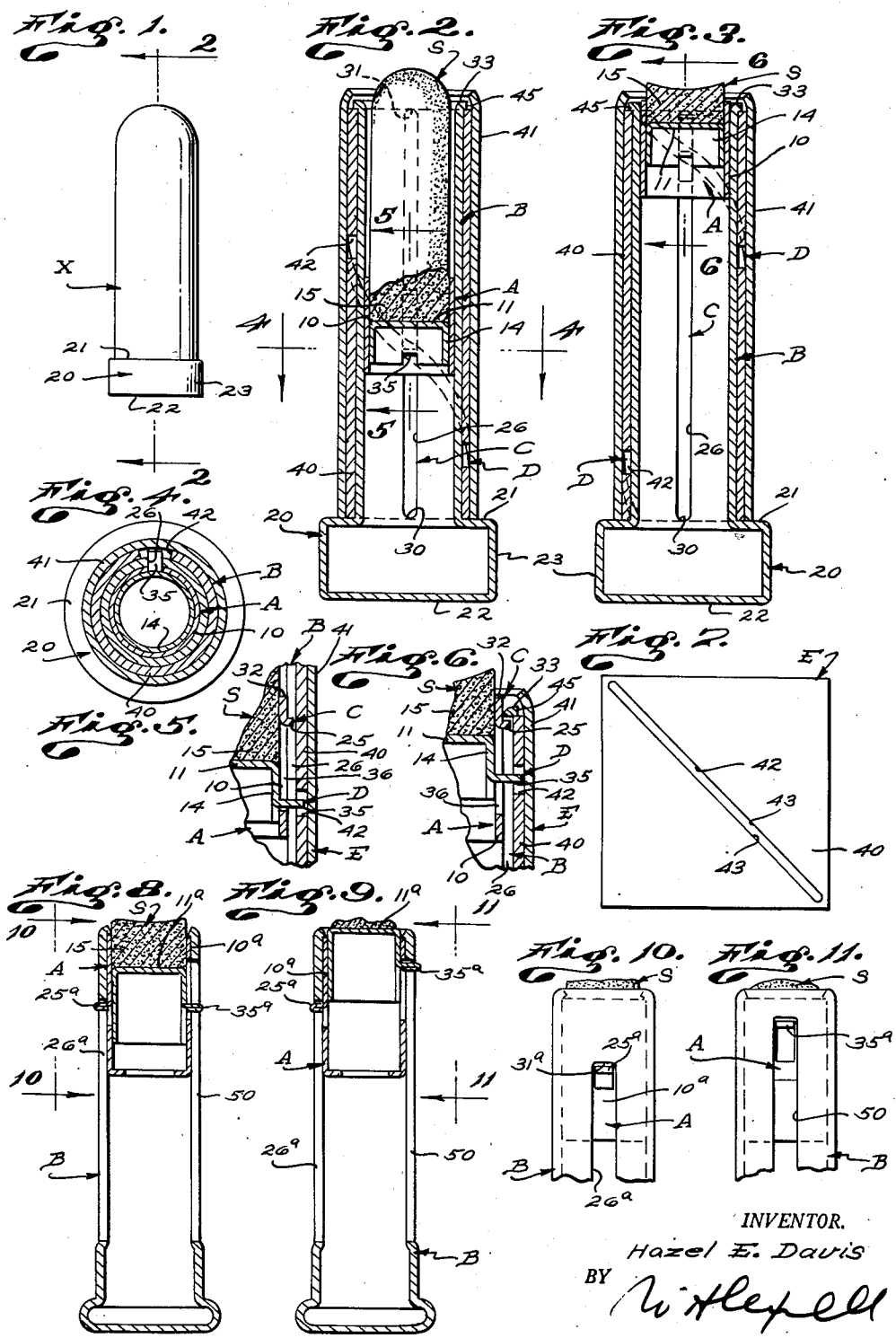
INVENTOR.
Hazel E. Davis
BY
Attorney Oct. 12, 1954

H. E. DAVIS 2,691,439

MATERIAL HOLDER

Filed Aug. 2, 1951

2 Sheets-Sheet 2

INVENTOR.
Hazel E. Davis
BY
Attorney

Patented Oct. 12, 1954

2,691,439

UNITED STATES PATENT OFFICE 2,691,439

MATERIAL HOLDER

Hazel E. Davis, Long Beach, Calif.

Application August 2, 1951, Serial No. 240,005

2 Claims. (Cl. 206—56)

This invention has to do with a material holder and it is a general object of the invention to provide a device that is simple, practical and convenient to operate, and which will advantageously hold or handle materials in stick form, as for instance, lipstick, or the like.

Various materials are advantageously employed in stick form, for instance, as medicaments, beauty aids or cosmetics, etc. In a conventional structure for handling such stick material, it is common to provide a cup that receives one end or section of the stick and a structure that carries the cup so that the stick can be moved into and out of position where an end thereof is accessible or available for use. With the usual or conventional type of construction, it is common that a substantial portion of the stick be enclosed in the cup and that portion is consequently not conveniently available for use and is in most cases lost or discarded without being put to use.

It is a general object of this invention to provide a structure handling a stick of material, such, for example, as a lipstick, and normally carrying such stick in a cup in such manner that the portion of the material initially installed in the cup is finally made available for use without requiring that it be dug or picked from the cup.

It is another object of this invention to provide a device of the general character referred to characterized by a cup with a shell portion initially holding a part of the stick of material and a bottom shiftable relative to the shell to effect feeding of the material out of the shell as it is required for use.

Another object of this invention is to provide a device of the general character referred to involving few simple, inexpensive parts which combine to form a mechanism compact in form, effective in handling a stick of material and simple as well as convenient to use.

The device of the present invention involves a cup carrying the stick of material, which cup includes relatively movable parts, namely, a cylindrical shell into which the base end portion of the stick is inserted and a bottom carried in the shell beneath the base end of the stick and slidable longitudinally in the shell. The bottom is preferably frictionally engaged with the shell to normally remain therein in whatever position it is left following the application of suitable force deliberately moving it relative to the shell. A body is provided and is preferably an elongate tubular element. The body is open at its outer end and is preferably closed at its inner end where it is provided with a head or enlargement. The cup is slidably carried in the body to operate longitudinally therein between a retracted position where the stick of material, in its initial form, is wholly within the body, and an extended position, where the cup is at the open end of the body, making even the base portion of the stick accessible at that point. A guide and stop means is provided for the shell of the cup and involves a projection or lug on the shell operating an elongate guide slot in the body. Cooperation of the shell lug and the ends of the guide slot stops the cup in the retracted position, and stops the shell of the cup with its outer or discharge end flush with the outer end of the body. An actuating means is provided for the cup and normally serves to move both elements of the cup, that is, the shell and the bottom as a unit between the position hereinafter referred to. The actuating means involves an actuator in the form of a projection or lug on the bottom of the cup accessible for operation so that by engagement or movement thereof the cup can be moved until the shell thereof reaches the extended position following which the bottom can be moved relative to the shell until it is substantially flush with the discharge end of the shell. In one form of the invention, the bottom projection may extend through the guide-way or opening in the body that accommodates the shell lug. An elongate opening or slot is provided in the shell accommodating the bottom projection to permit of the desired movement of the bottom relative to the shell. In another form of the invention the bottom projection operates in a slot or guide-way in the body which slot or guide-way is longer than the one accommodating the shell projection, making it possible to move the bottom further outward than the shell in order to effect the desired movement of the bottom relative to the shell after the shell has been stopped flush with the outer end of the body. In practice, an operating means may be provided, and in a typical case, this means may involve a cam element surrounding the body and having a cam slot accommodating and cooperating with the bottom projection. In a preferred construction, a sleeve surrounds and holds or carries the cam element and is rigid therewith. The combined cam element and sleeve are held on the body between a lip at the outer end of the body and the head at the inner end of the body, and this unit is free to rotate on the body in order to effect the desired cooperation between the cam element and the bottom projection.

Figure 13:
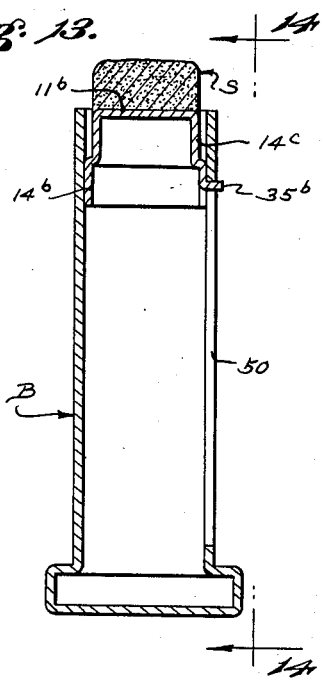
Figure 14:
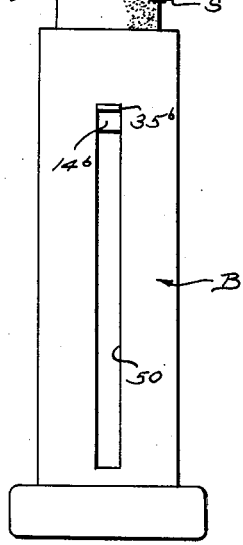
Figure 15:
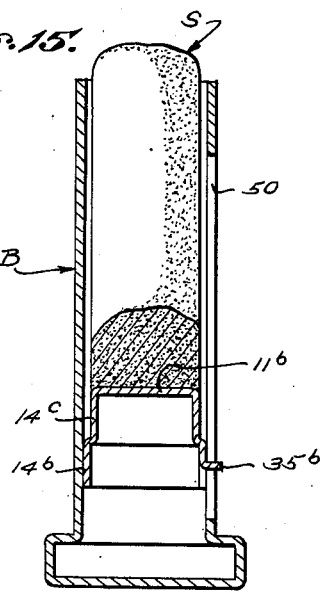

The various objects and features of my invention will be fully understood from the following detailed description of a typical preferred form and application of the invention, throughout which description reference is made to the accompanying drawings, in which:

Fig. 1 is a side elevation of a device embodying the present invention, showing a protective closure or cap thereon. Fig. 2 is a longitudinal detailed sectional view of the device shown in Fig. 1 with the cap or closure removed, and showing a stick of material in position with its working end exposed at the outer end of the body of the device. Fig. 3 is a view similar to Fig. 2 showing the shell of the cup stopped flush with the outer end of the body and the bottom of the cup actuated to a point where practically the entire base portion of the stick has been pushed from the shell. Fig. 4 is a plan section taken as indicated by line 4—4 on Fig. 2 Fig. 5 is a vertical section taken as indicated by line 5—5 on Fig. 2. Fig. 6 is a vertical section taken as indicated by line 6—6 on Fig. 3. Fig. 7 is a view of the cam element in an initial or flat form and showing it apart from other elements of the device. Fig. 8 is a longitudinal detailed sectional view of another form of device embodying the invention, showing the parts positioned with the shell of the cup stopped in the extended position. Fig. 9 is a view similar to Fig. 8, showing the bottom of the cup fully actuated relative to the shell of the cup so that the entire stick of material has been ejected therefrom. Fig. 10 is a side elevation of the structure shown in Fig. 8, being a view taken as indicated by line 10—10 on Fig. 8. Fig. 11 is a side elevation of a portion of the structure shown in Fig. 9, being a view taken as indicated by line 11—11 on Fig. 9. Fig. 12 is a view similar to Fig. 8, showing another form of construction and illustrating the stick of material completely retracted to be within the body. Fig. 13 is a view similar to Fig. 12 showing the stick completely actuated and with but a limited portion remaining to be used. Fig. 14 is a side elevation of the structure, being a view taken as indicated by line 14—14 on Fig. 13 and Fig. 15 is a view similar to Fig. 12 showing one element eliminated so that the stick is carried by the bottom without the aid of a shell.

The structure provided by the present invention can be employed to advantage to handle stick material of various types or intended for various purposes. The invention is particularly useful and practical for the handling of stick material such as is used on the lips and which is ordinarily referred to as lipstick. In view of this circumstance, the invention is shown incorporated in structures that can be employed for the handling of lipsticks and the material will be referred to as lipstick material, whereas it is to be understood that such disclosure and reference is not to be construed as limiting the principles of invention that are involved.

Referring first to the form of the invention shown in Figs. 1 to 7, inclusive, the structure involves, generally, a cup A carrying a lipstick S and supported by a body B. The cup is characterized by a tubular shell 10 and a bottom 11 shiftable longitudinally in the shell. A stop and guide means C guides the shell 10 of the cup in the body and limits its movement therein, and an actuating means D normally serves to shift or operate the cup bodily in the body and is operable to shift the bottom 11 of the cup relative to the shell 10 thereof after movement of the shell has been stopped by the means C. In this particular form of the invention, an operating means E is provided for operating the means D.

The cup A in the form illustrated involves a shell 10 of simple form, that is, a plain, simple, tubular shell of cylindrical form, open at both ends. The bottom 11 of the cup is preferably a flat, disc-shaped element, and it is slidably related to and is guided in the shell so that it is in a plane normal to the longitudinal axis of the shell. In the preferred construction, a flange or skirt 14 projects from the bottom or inner side of the bottom 11 and is cylindrical in form and is slidably engaged in the shell 10. The fit between the skirt 14 and the inner wall of shell 10 is a sliding fit, and such as to establish friction between the elements of the cup so that the bottom will not move lengthwise of the shell unless deliberately operated relative thereto.

The stick S of material is of suitable form and length, and in its initial form it may be of substantial length and has its base portion 15 extending a substantial distance into the outer end of shell 10 of the cup and engaged with the bottom 11 of the cup. Under such conditions, the bottom 11 is not what may be termed a down or retracted position in the shell of the cup.

The body B of the structure is preferably an elongate tubular element, and in the case illustrated it is open at its outer or upper end and is provided at its inner end with an enlargement or head 20. The particular head illustrated involves an annular end 21, a disc-shaped end 22 and a cylindrical handling portion 23 connecting the ends 21 and 22. The body B is preferably straight and uniform in size from one end to the other and its interior is such as to slidably carry or accommodate the cup A.

The guide and stop means C is related to the shell 10 of the cup A and, in a preferred form, it involves a simple projection or lug 25 on the shell 10 projecting at the exterior thereof into an elongate guide-way or slot 26 provided in the body B. The slot or guide-way 26 is shown as extending lengthwise of the body and parallel with the longitudinal axis of the body, and it has an inner end or stop 30 and an outer end or stop 31. The projection 25 of the shell 10 cooperates with the slot 26 so that the shell of the cup is held against rotation in the body, and it cooperates with the stop 31 to limit outward movement of the shell in the body, and it positively stops the shell of the cup in an out or fully actuated position where its outer end 32 is substantially flush with or possibly slightly outward of the outward end 33 of body B.

The actuating means D for cup A serves normally to effect movement of the cup A as a unit or bodily lengthwise in body B, and it is operable to effect shifting of the bottom of the cup outward in the shell thereof after the shell has been stopped by the stop 31, in the manner above described. In the form illustrated, the actuating means D involves an actuator in the form of a projection or lug 35, on the bottom 11 of the cup, which is accessible so that it can be engaged and moved lengthwise of the body. In the case illustrated, projection 25 projects radially outward from the bottom of the cup through a suitable opening or slot 36 in the shell of the cup through the guideway or opening 26 in the body to the exterior of the body at which point it is accessible.

Through the construction and relationship of parts just described, the outer end portion of projection 35 can be engaged and operated longitudinally of body B with resulting longitudinal movement of the control A in body B. The longitudinal slot 36 in the shell 10 of the cup is of such extent, and it extends lengthwise of the shell so that after the shell has been stopped as by the stop 31, outward movement of the bottom of the cup can be continued until the bottom 11 has been moved to the outer end of the shell to be flush with the end 32 or possibly beyond the end 32, making all of the material of the stick S available for use. It will be noted that the engagement of the projection 35 in or through the guideway 26 holds the bottom of the cup against rotation relative to the shell of the cup, which shell is held against rotation by engagement of the projection 25 in the guideway 26.

When an operating means E is employed as illustrated in the form of the invention being described, it engages the projection 35 of the cup and it may be an element adapted to be operated manually or from the exterior of the device to effect movement of projection 35 lengthwise of the body B. In the case illustrated, the operating means involves a cam element 40 that engages and cooperates with projection 35, and a sleeve 41 related to and encasing the cam element.

The cam element 40 is shown as a sheet of material such as is shown in Fig. 7, curled or shaped to be cylindrical in form and it has a slot or cam opening 42 therein receiving the projection 35 so that the cam faces 43 that define the cam opening 42 cooperate with the projection 35. The cam faces 43 are shaped and related to, in effect, form a spiral or helical camway pitched so that, as the cam element is rotated relative to body B, the projection 35 is cammed or operated to move lengthwise of the body. The cam element is engaged around the body B to rotate thereon and the sleeve 41 preferably fits closely or tightly around the cam element 40 so that these elements are tight or rigidly engaged together to work as a unit.

The unit formed by the cam element 40 and sleeve 41 is confined on the body B against movement lengthwise thereof as by a retaining lip 45 at the outer end of the body and the head 20 at the inner end of the body. In the preferred construction, the outer end of the sleeve 41 extends somewhat beyond and may be turned in slightly to shield the lip 45, as shown in the drawings.

In accordance with the invention the elements hereinabove described are related so that the means E can be operated to move the projection 35 and, consequently, the bottom 11 of the cup, a substantial distance beyond a position where the shell of the cup is stopped by the engagement of projection 25 with stop 31. It will be readily apparent that when the projection 35 is thus operated beyond the position where the shell is stopped, the bottom 11 of the cup is caused to move outwardly in the shell. The parts are proportioned so that this movement of the bottom in the shell can occur until the bottom 11 reaches the outer end of the shell to be flush therewith or even somewhat beyond the shell with consequent complete ejection of the stick S from the cup. The shell having been stopped with its outer end 32 flush with or possibly projecting somewhat beyond the outer end 33 of the body, the operation of the bottom 11 to a position flush with the outer end of the shell makes all of the material of the stick S available at the outer end of the structure.

It will be understood, of course, that since the means E involves a helical cam-way or cam slot, the cup can be moved in and out relative to the body as circumstances require, and it will be understood that normally it is moved in to a position where its outer or working end is within the body when it is desired to apply the cap or closure X to the structure as shown in Fig. 1.

In the form of the invention illustrated in Figs. 8 to 11 of the drawings, the cup A may be substantially the same as that hereinabove described, except that the projections 25$^a$ and 35$^a$ on the shell 10$^a$ and bottom 11$^a$ of the cup, respectively, are at different rotative positions rather than being in the same rotative position as in the case first described. With the projections 25$^a$ and 35$^a$ in different rotative positions, there is a guideway 26$^a$ in the body B receiving and accommodating the projection 25$^a$ and a separate guideway 50 in the body B accommodating the projection 35$^a$.

The guideway 26$^a$ is of such length as to provide for the desired longitudinal movement of the shell 10$^a$ in the body B and its upper end forms a stop 31$^a$ limiting upward or outward movement of the shell in the body so the shell is stopped with its outer end substantially flush with the outer end of the body. The guideway 50 in body B accommodating projection 35$^a$, which projection is on the bottom of the cup, is of such length as to accommodate the projection 35$^a$ during normal movement of the shell permitted by guideway 36$^a$ and is of additional length or is extended upwardly to accommodate the projection 35$^a$ and allow it to be operated outwardly until the body 11$^a$ is flush with or possibly beyond the outer end of the shell, as shown in Fig. 9 of the drawings.

In the form of the invention shown in Figs. 8 to 11, the operating means is eliminated from the structure and the projection 35$^a$ instead of being accessible to such a means is accessible at the exterior of the body B and is exposed so that it can be engaged manually. Since full operation of the structure can be effected by engaging and moving projection 35$^a$ relative to body B, it is preferred to limit the size of projection 25$^a$ so that it is not relied upon or ordinarily engaged for purpose of moving the cup relative to the body.

In the form of the invention shown in Figs. 12, 13 and 14 the body B may be the same as that shown in Figs. 8 to 11. In this case the bottom 11$^b$ with its depending skirt 14$^b$ is slidably supported in the body B, there being no intervening shell between these elements. The stick support formed by the bottom 11$^b$ and its depending skirt 14$^b$ is directly mounted in the body and has a projection 35$^b$ shown projecting through a longitudinal slot 50 in the body B. A simple tubular shell 10$^b$ is shown coupling the stick S of material to the unit including the bottom 11$^b$. The tubular shell 10$^b$ may, in practice, be of light material subject to being removed or torn away when the lower end or base portion of the stick is desired to be exposed. In practice the shell 10$^b$ may be formed of paper or the like. When this construction is employed it is preferred that the skirt 14$^b$ be formed with a neck portion 14$^c$ connecting the portion of the skirt that slidably engages the body with the bottom 11$^b$. The neck portion 14$^c$ of the skirt is smaller in diameter than the opening defined by the body and it may be of the same diameter as the stick S. In such case the tubular shell 10$^b$ may be uniform in size from one end to the other and from Fig. 12 of the drawings it will be apparent how the sleeve effectively couples the stick with the element which supports the stick and which slides in the body. The projection 35$^b$, accessible at the exterior of the body, provides a convenient means by which the stick can be operated between a retracted position such as is shown in Fig. 12, and a position such as is shown in Fig. 13.

Employing the general construction just described, that is, when employing a body B with a bottom 11$^b$ having a skirt 14$^c$ as above described, it may be unnecessary to use the sleeve 10$^b$ or its equivalent. In some cases the stick S can be applied directly to the bottom 11$^b$ and may be of such material as to effectively remain attached to the bottom without requiring the use of a sleeve or other such means, as hereinabove described. A construction without a sleeve is shown in Fig. 15 of the drawings.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A device adapted to handle a stick of material including, an elongate slotted tubular body with an open outer end and with circumferentially spaced longitudinal slots therein, a cup slidably carried in the body to move longitudinally thereof and including, a shell adapted to receive the stick from its outer end and a bottom frictionally engaged in the shell and engaging the stick and movable lengthwise of the shell, means stopping movement of the shell relative to the body with the outer end of the body including a projection on the shell operating in one of the slots in the body, and means operating the bottom relative to the shell to a position substantially flush with the outer end of the shell including a projection on the bottom operating in the other slot in the body, the shell having a slot therein passing the projection on the bottom and limiting movement of the bottom relative to the shell.

2. A device adapted to handle a stick of material including, an elongate tubular body with an open outer end and straight elongate diametrically opposite side openings, a unit in the body including a shell slidably supported by the body and having a longitudinal side opening and a bottom slidably carried by the shell to support the stick of material in the shell, a projection on said shell slidably engaged in one of the openings in the body, and a projection on the bottom extending through the opening in the shell and projecting into the other opening in the body.

References Cited in the file of this patent

UNITED STATES PATENTS

| Number | Name | Date |
| --- | --- | --- |
| 2,178,279 | Fullmer | Oct. 31, 1939 |
| 2,355,565 | See | Aug. 8, 1944 |
| 2,429,328 | Rault | Oct. 21, 1947 |
| 2,589,000 | Vani | Mar. 11, 1952 |